US008424312B2

(12) United States Patent
Conete et al.

(10) Patent No.: US 8,424,312 B2
(45) Date of Patent: Apr. 23, 2013

(54) EXHAUST SYSTEM FOR GAS TURBINE (75) Inventors: Eric Conete, Merignac (FR); Laurent Baroumes, Bordeaux (FR); Georges Habarou, Le Bouscat (FR)

(73) Assignee: Snecma Propulsion Solide, Le Haillan Cedex (FR)

( * ) Notice: Subject to any disclaimer, the term of this patent is extended or adjusted under 35 U.S.C. 154(b) by 692 days.

(21) Appl. No.: 12/599,345

(22) PCT Filed: May 7, 2008

(86) PCT No.: PCT/FR2008/050801
§ 371 (c)(1),
(2), (4) Date: Nov. 18, 2009

(87) PCT Pub. No.: WO2008/148999
PCT Pub. Date: Dec. 11, 2008

(65) Prior Publication Data
US 2010/0205930 A1 Aug. 19, 2010

(30) Foreign Application Priority Data

May 10, 2007 (FR) .................................... 07 54968

(51) Int. Cl.
F02K 1/40 (2006.01)
(52) U.S. Cl.
USPC .................. 60/796; 60/770; 60/771; 60/799;
248/554; 29/889.2; 239/265.11; 239/265.25
(58) Field of Classification Search .................... 60/248,
60/262, 796, 770, 771, 799; 249/265.11,
249/265.25; 29/889.2; 239/265.11, 265.25;
248/554; 244/54
See application file for complete search history.

(56) References Cited

U.S. PATENT DOCUMENTS

| 2,479,573 | A |   | 8/1949  | Howard |
|-----------|---|---|---------|--------|
| 2,580,207 | A |   | 12/1951 | Whittle |
| 2,604,339 | A |   | 7/1952  | Kaysing et al. |
| 2,613,087 | A |   | 10/1952 | Alford |
| 5,088,279 | A | * | 2/1992  | MacGee ...................... 60/226.1 |
| 5,307,624 | A | * | 5/1994  | Even-Nur et al. ............. 60/226.3 |
| 6,817,184 | B2 | * | 11/2004 | Groeber et al. .................. 60/770 |
| 8,141,370 | B2 | * | 3/2012  | Bulman et al. .................. 60/796 |

FOREIGN PATENT DOCUMENTS

GB                621422         4/1949

* cited by examiner

*Primary Examiner* — William H Rodriguez
*Assistant Examiner* — Steven Sutherland
(74) *Attorney, Agent, or Firm* — Preti Flaherty Beliveau & Pachios LLP (57) ABSTRACT The invention relates to an exhaust system (100) for channeling the streams from a by-pass gas turbine, the system comprising a stream channeling nozzle and an exhaust casing (110) for connecting the channeling nozzle to the outlet of the gas turbine, said channeling nozzle comprising a primary nozzle (120) fastened to the exhaust casing (110) and a secondary nozzle (130) placed around the primary nozzle. The exhaust system further comprises means for fastening the secondary nozzle (130) directly to the exhaust casing (110), said secondary nozzle being supported by the exhaust casing independently of the primary nozzle (120).

18 Claims, 6 Drawing Sheets

EXHAUST SYSTEM FOR GAS TURBINE

BACKGROUND OF THE INVENTION

The present invention relates to the general field of systems used for exhausting gas from a gas turbine, in particular for aviation by-pass gas turbines, i.e. gas turbines having at least two distinct streams flowing therethrough (a primary or "core" stream and a secondary or "by-pass" stream). The invention relates more particularly to exhaust systems for such gas turbines having a primary nozzle and a secondary nozzle that are designed to be placed concentrically at the outlet from such a gas turbine.

Figure 1:
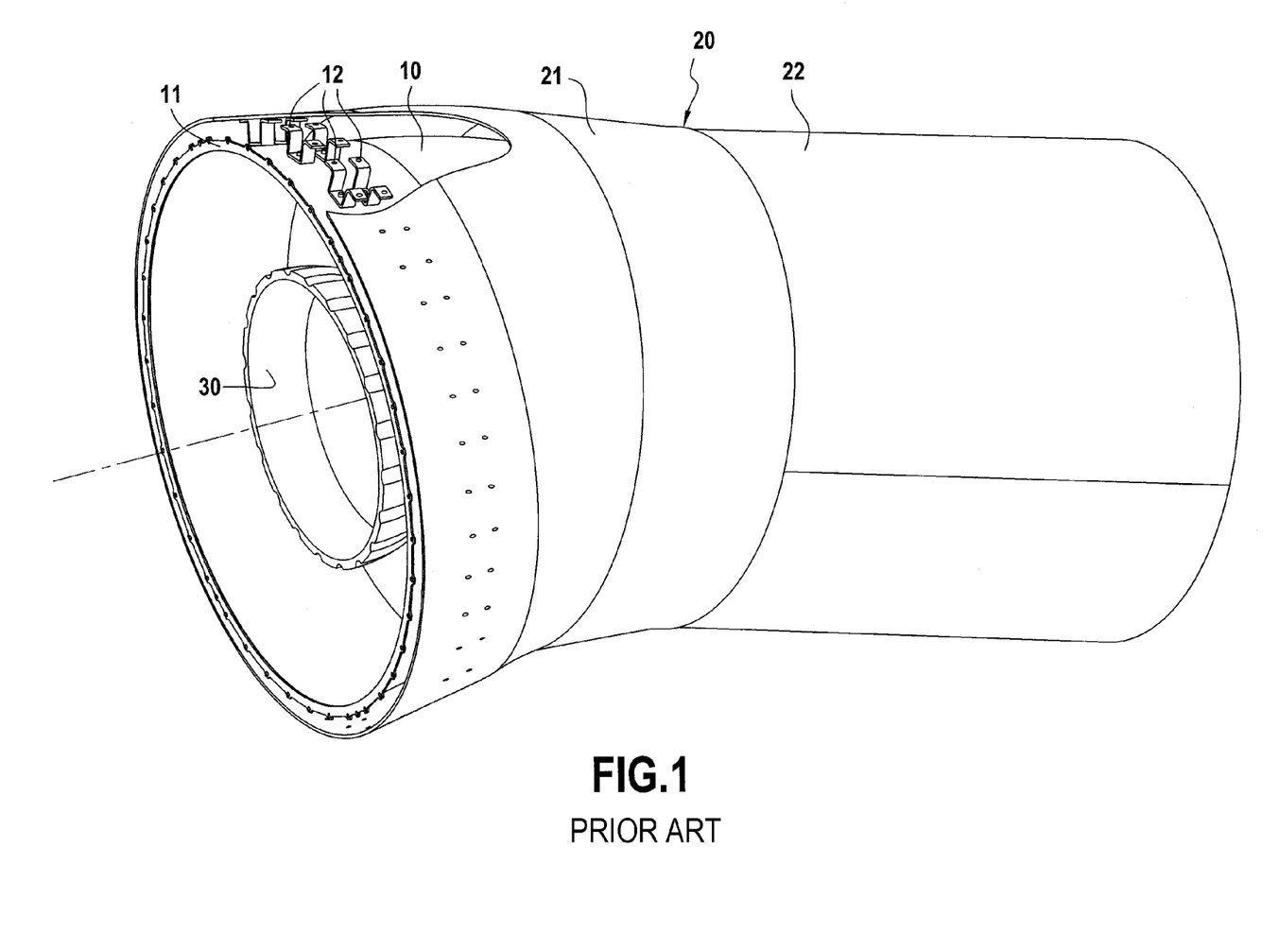
FIG. 1, described above, is a diagrammatic view of a prior art exhaust system for a by-pass gas turbine.

FIG. 1 is a fragmentary and diagrammatic view of an exhaust system for an aeroengine delivering separate streams and comprising a primary nozzle 10 placed inside a secondary nozzle 20 made up of two portions, namely an upstream secondary nozzle 21 and a downstream secondary nozzle 22 (where the terms "upstream" and "downstream" are used herein relative to the flow direction of the stream of gas through the engine). A central body or "plug" 30 is present inside the primary nozzle 10.

The primary nozzle 10 is designed to be connected to the exhaust casing of the engine via a radial flange 11, while the secondary nozzle 20 is attached by its upstream portion 21 to the primary nozzle 10 by means of supports 12. With this architecture, the secondary nozzle 20 is supported entirely by the primary nozzle 10, which is subjected via its radial flange 11 to all of the mechanical loads that pass through both nozzles.

Consequently, the primary nozzle 10, which corresponds to the structural portion of the exhaust system that needs to support the secondary nozzle and to withstand mechanical and thermal loads, must be made of a refractory material that is strong enough to withstand all these stresses. The primary nozzle is typically made of a metallic material such as Inconel®.

That type of design for an exhaust system presents the drawback of subjecting the primary nozzle to high mechanical loads, thereby reducing its lifetime and increasing expensive maintenance costs.

Furthermore, that exhaust system architecture presents relatively high overall weight cantilevered out inside the engine, thereby increasing the mechanical loading on the flange of the nozzle exhaust casing.

OBJECT AND SUMMARY OF THE INVENTION

An object of the present invention is to propose a novel design for a by-pass gas turbine exhaust system delivering separate streams, which design serves to limit the mechanical loads to which the primary nozzle is subjected without weakening the overall strength of the system.

To this end, the present invention provides an exhaust system for channeling the streams from a by-pass gas turbine, the system comprising a stream-channeling nozzle and an exhaust casing for connecting the channeling nozzle to the outlet of the gas turbine, said channeling nozzle comprising a primary nozzle fastened to the exhaust casing and a secondary nozzle placed around the primary nozzle, the exhaust system being characterized in that it further comprises means for fastening the secondary nozzle directly to the exhaust casing, said secondary nozzle being supported by the exhaust casing independently of the primary nozzle.

Thus, by adapting the secondary nozzle directly to the exhaust casing independently of the primary nozzle, the primary nozzle is dispensed with its role of supporting the secondary nozzle, thereby enabling mechanical forces on the primary nozzle to be reduced. With the design of the invention, the mechanical forces are shared between the primary nozzle and the secondary nozzle, each of which is fastened to the exhaust casing. The forces to which the primary and secondary nozzles are subjected are taken up by the exhaust casing, which, by its very nature, presents a structure that is strong. The reliability, and consequently the lifetime of the exhaust system are thus improved.

With the architecture of the exhaust system of the invention, the inner primary nozzle no longer performs a structural role, since it no longer supports the secondary nozzle. It serves solely as a liner to perform a channeling function on the primary or "hot" stream. The weight of the primary nozzle can therefore be reduced significantly, in particular by using a ceramic matrix composite (CMC) material instead of a metallic material.

In an aspect of the invention, a plurality of flexible connection elements are distributed around the upstream end of the primary nozzle, these elements being fastened to the outer wall of the primary nozzle and to the flange of the exhaust casing. Unlike prior art exhaust systems in which the primary nozzle is fastened rigidly to the exhaust casing, the use of flexible connections between the primary nozzle and the exhaust casing makes it possible to compensate for differential expansion between the casing and the primary nozzle, particularly when these two elements are made of materials having different coefficients of expansion.

According to another aspect of the invention, at least a portion of a flexible connection element of the primary nozzle is engaged with a connection element of the secondary nozzle in such a manner that the orifices for fastening to the flange of the exhaust casing in said elements co-operate with one another. With this configuration, a single fastener member (e.g. a bolt fastener) is used to fasten both a portion of a flexible connection element of the primary nozzle and a connection element of the secondary nozzle to the casing, thereby making it possible to optimize the overall weight of the system.

The secondary nozzle is made up of an upstream secondary nozzle fastened to the exhaust casing and a downstream secondary nozzle fastened to the end of the upstream secondary nozzle opposite from its end that is fastened to the casing, with it being possible for the two secondary nozzles to be made of materials having different coefficients of expansion. In particular, the upstream secondary nozzle is made of a metallic material and the downstream secondary nozzle is made of a ceramic matrix composite material.

In a particular embodiment, the edge portion of the upstream secondary nozzle and the edge portion of the downstream secondary nozzle are engaged one in the other with little or no clearance, and one of the secondary nozzles presents along its engagement edge a succession of tongues that are spaced apart by slots and that are formed integrally with the secondary nozzle, said secondary nozzles being assembled together by being mutually fastened via at least some of the tongues. In this way, the flexible connection function for compensating differential expansion between the upstream and downstream secondary nozzles is incorporated directly in one of the two secondary nozzles, thereby simplifying assembly between the two secondary nozzles.

Preferably, but not exclusively, the tongues are formed in the upstream secondary nozzle that presents the greater coefficient of expansion.

The present invention also provides a by-pass gas turbine for an aeroengine that includes an exhaust system as defined above.

The invention also provides a method of assembling an exhaust system comprising a stream-channeling nozzle and an exhaust casing for connection to the channeling nozzle at the outlet from the gas turbine, said channeling nozzle comprising a primary nozzle fastened to the exhaust casing and a secondary nozzle disposed around the primary nozzle, the method being characterized in that the secondary nozzle is fastened directly to the exhaust casing so that said secondary nozzle is supported by the exhaust casing independently of the primary nozzle.

The primary nozzle may be made of a ceramic matrix composite material and it may be fastened to the exhaust casing via a plurality of flexible connection elements disposed around the upstream end of the primary nozzle.

In a particular implementation, at least a portion of a flexible connection element of the primary nozzle is engaged with a connection element of the secondary nozzle in such a manner that the orifices for fastening to the flange of the exhaust casing in said elements co-operate with one another.

The secondary nozzle is made up of an upstream secondary nozzle fastened to the exhaust casing and a downstream secondary nozzle connected to the end of the upstream secondary nozzle that is opposite from its end fastened to the casing. The upstream secondary nozzle may be made of a metallic material and the downstream secondary nozzle may be made of a ceramic matrix composite material.

The flexible connections between the two secondary nozzles may be made by engaging the edge portion of the upstream secondary nozzle with the edge portion of the downstream secondary nozzle with little or no clearance, and by forming along the engagement edge of one of the two secondary nozzles a succession of tongues that are spaced apart from one another by slots obtained by cutting out or machining the material of the said secondary nozzle, the secondary nozzles being assembled together by fastening at least some of the tongues to the edge portion of the other secondary nozzle.

BRIEF DESCRIPTION OF THE DRAWINGS

Other characteristics and advantages of the invention appear from the following description of particular embodiments of the invention, given as non-limiting examples, and with reference to the accompanying drawings, in which.

DETAILED DESCRIPTION OF AN EMBODIMENT

Figure 2:
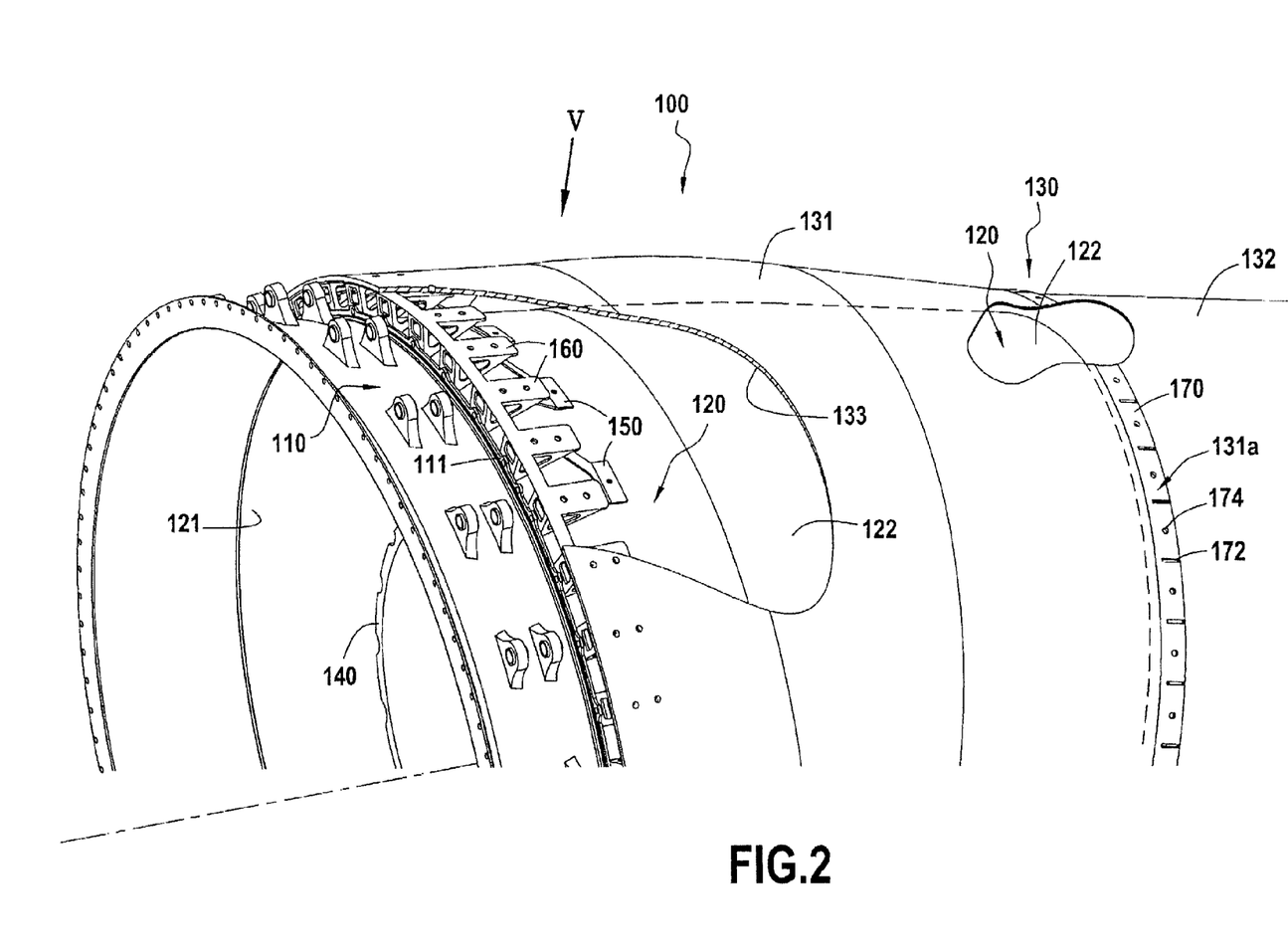
FIG. 2 is a fragmentary diagrammatic view of a by-pass gas turbine exhaust system constituting an embodiment of the invention.

A particular but non-exclusive field of application of the invention is that of by-pass gas turbines for aeroengines. FIG. 2 shows an exhaust system 100 for a by-pass aviation gas turbine in accordance with an embodiment of the invention. The exhaust system comprises an exhaust casing 110 designed to be fastened to the outlet from the gas turbine upstream from its combustion chamber (not shown).

The exhaust system also includes a nozzle for channeling the stream from the gas turbine, which nozzle is located downstream from the exhaust casing 110 and comprises a primary nozzle 120 and a secondary nozzle 130, the secondary nozzle being made up of an upstream wall portion or upstream secondary nozzle 131 and a downstream wall portion or downstream secondary nozzle 132 that extends the primary nozzle 120 and the upstream secondary nozzle 131 in a downstream direction.

Between its inner wall 121 and a central body and an element or "plug" 140 disposed therein, the primary nozzle 120 defines a flow channel for the primary or "hot" stream that comes from the combustion chamber of the turbine.

Between its inner wall 133 and the outer wall 122 of the primary nozzle 120, the upstream secondary nozzle 131 defines an annular flow space in which there flows a by-pass or "cold" stream coming from a fan (not shown) at the inlet to the turbine, and serving in particular as a cooling stream, in particular for the outer wall 122 of the primary nozzle.

Figure 3:
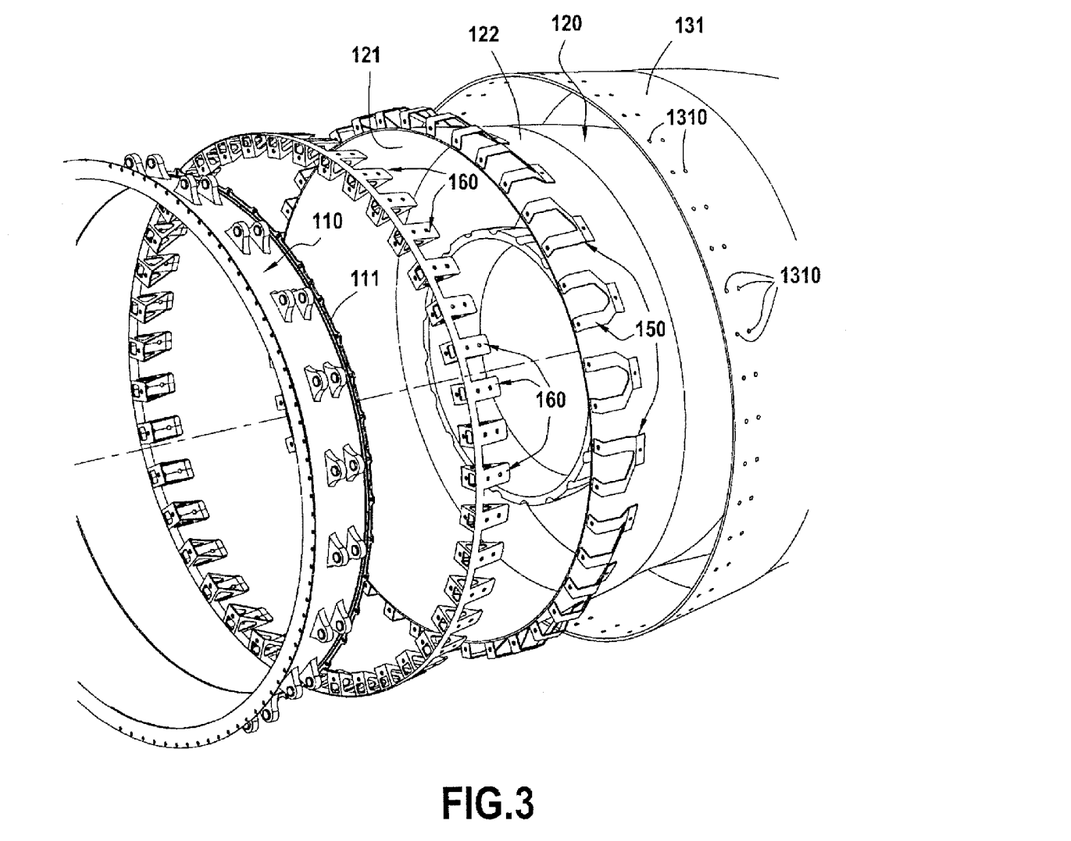
FIG. 3 is an exploded view showing the connection elements used in the FIG. 2 exhaust system for fastening the primary and secondary nozzles to the exhaust casing.
Figure 4:
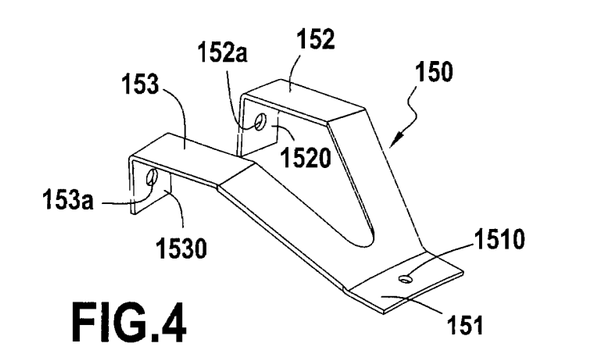
FIG. 4 is a perspective view on a larger scale of a flexible connection element of FIG. 3.
Figure 6:
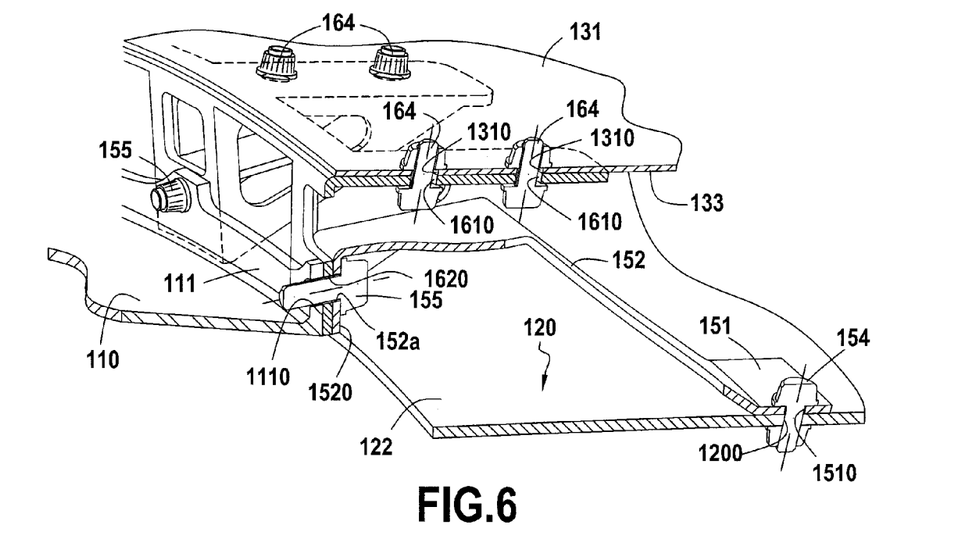
FIG. 6 is a fragmentary section view on staggered plane VI-VI of FIG. 5.

In accordance with the present invention, the primary nozzle 120 and the secondary nozzle 130, or more precisely the upstream secondary nozzle 131, are each fastened to the exhaust casing 110 via respective attachment means. As shown in FIGS. 3 and 4, the primary nozzle 120 is fastened to the casing 110 by means of a plurality of flexible connection elements 150 that are uniformly distributed on the outer wall 122 of the primary nozzle in the vicinity of its upstream end. As shown in FIG. 4, each flexible connection element 150 comprises a base 151 for fastening to the outer wall 122 of the primary nozzle 120 and including an orifice 1510 for passing bolt fasteners 154 (FIG. 6). Each orifice 1510 co-operates with an orifice 1200 formed in the primary nozzle 120. The flexible connection element 150 includes two fastener tabs 152 and 153 with the free end of each of them being folded to form respective portions 152a and 153a suitable for being fastened to the exhaust casing. For this purpose, the portions 152a and 153a include respective orifices 1520 and 1530 that co-operate with orifices 1110 formed in the fastener flange 111 of the exhaust casing 110 and suitable for passing bolt fasteners 155 (FIG. 6).

The elements 150 can be fastened to the primary nozzle 120 and to the fastener flange 111 with any type of appropriate fastener member other than bolt fasteners (e.g. with rivets).

The flexible connection elements 150 make it possible to compensate for the differential expansion that can occur between the primary nozzle 120 and the exhaust casing 110. Any other form of element enabling a flexible connection to be made between the casing and the primary nozzle and suitable for compensating differential expansion could be envisaged.

Figure 7:
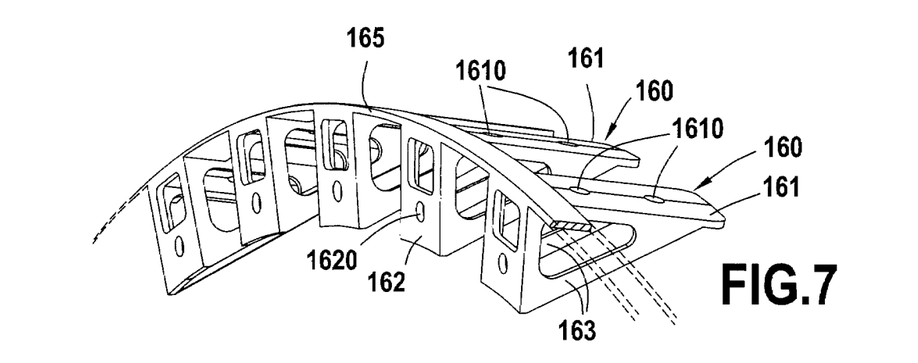
FIGS. 7 and 8 are perspective views on a larger scale of connection elements of FIG. 3.
Figure 8:
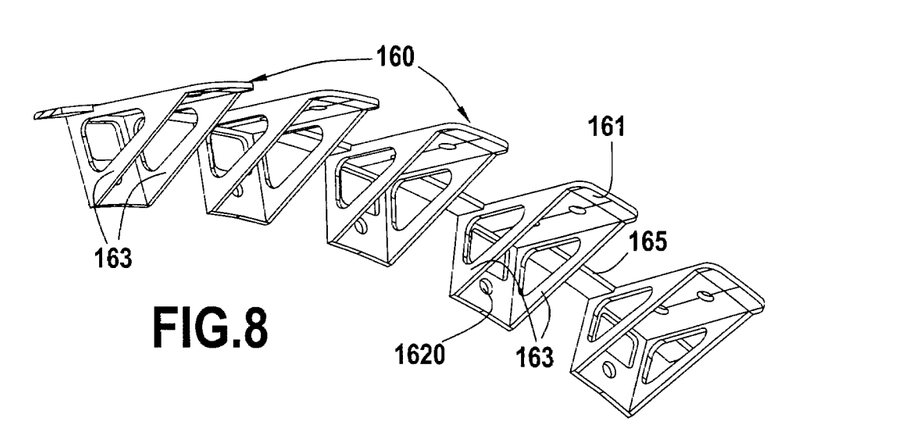

The secondary nozzle 130 is fastened to exhaust casing via its upstream secondary nozzle 131 by means of a plurality of connection elements 160 that are distributed uniformly on the inner wall 133 of the upstream secondary nozzle in the vicinity of its upstream end. As shown in FIGS. 7 and 8, each connection element 160 comprises a first portion 161 designed to be fastened on the inner wall 133 of the upstream secondary nozzle and including two orifices 1610 for passing bolt fasteners 164 (FIG. 6). The orifices 1610 co-operate with respective orifices 1310 formed in the upstream secondary nozzle 131.

Each connection element 160 includes a second portion 162 that is substantially perpendicular to its first portion 161 and that is designed to be fastened to the fastener flange 111 of the exhaust casing. Each second portion 162 includes an orifice 1620 that co-operates with an orifice 1110 formed in the fastener flange 111 of the exhaust casing 110 and suitable for passing bolt fasteners 155 (FIG. 6). The structure of the connection elements 160 is reinforced by connection arms 163 that extend between the free ends of the first and second portions 161 and 162. Furthermore, the connection elements 160 are connected together by a ring 165. Nevertheless, it is possible for the connection elements to be independent from one another.

Figure 5:
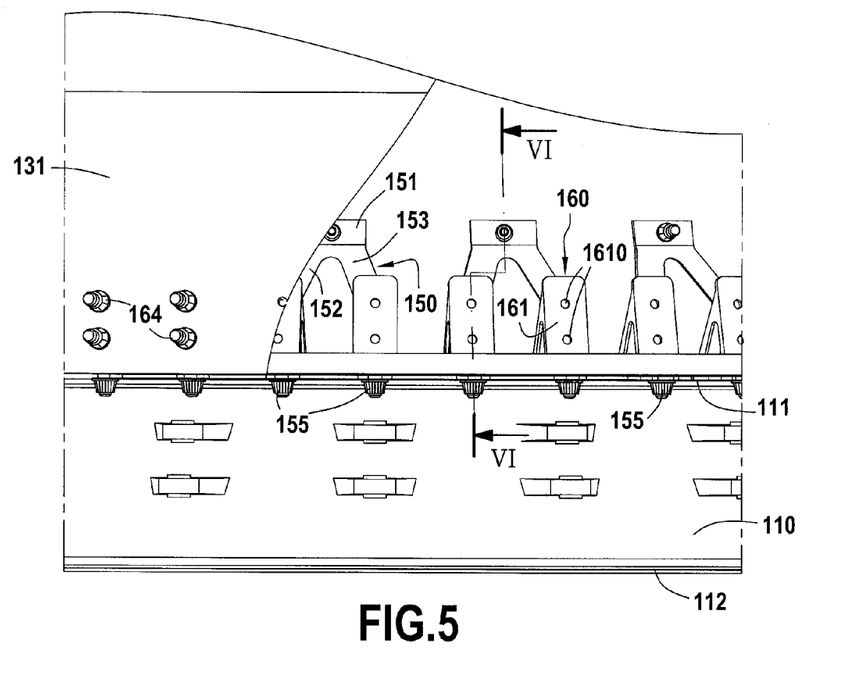
FIG. 5 is a view on a larger scale showing a detail of FIG. 2.

In the embodiment described herein, and as shown more particularly in FIGS. 2 and 5, the fastener tabs 152 and 153 of the flexible connection elements 150 are engaged in the connection elements 160 in such a manner that their through orifices for the bolt fasteners co-operate with those of the fastener flange 111 of the exhaust casing 110. With this configuration, only one bolt fastener is used for fastening both a tab of an element 150 and an element 160, thereby making it possible to reduce the overall weight of the system. Nevertheless, the elements 160 and 150 could equally well be placed side by side and fastened to the casing via fastener members that make use of distinct orifices in the fastener flange.

The upstream secondary nozzle 131 is typically made of titanium or titanium alloy.

The downstream secondary nozzle 132, commonly made of a refractory metallic material such as Inconel®, can advantageously be made of a ceramic matrix composite (CMC) material of high-temperature behavior that enables it to withstand the temperature of the hot gas stream passing through this part of the exhaust system without damage and without being cooled. It should be observed that the "cold" stream passing through the angular space between the inner wall 133 of the upstream secondary nozzle 131 and the outer wall 122 of the primary nozzle 120 constitutes a protective film of cold air at the upstream portion of the inside surface of the upstream secondary nozzle 132.

Use of CMC material for the downstream secondary nozzle thus makes it possible to limit the overall requirement in cooling air and thus to have a simple structure for the downstream secondary nozzle, while significantly reducing weight compared with using a metallic material.

CMC materials are indeed remarkable concerning their thermostructural properties and their ability to conserve these properties at high temperatures. They are constituted by fiber reinforcement made up of refractory fibers (carbon fibers or ceramic fibers) and densified by a ceramic matrix, in particular of a carbide, nitride, refractory oxide, . . . . Typically examples of CMC materials are materials having carbon fibers and a silicon carbide matrix (C—SiC), materials having silicon carbide fibers and a silicon carbide matrix (SiC—SiC), and materials having carbon fibers and a mixed carbon and silicon carbide matrix (C-C/SiC). It is well known how to fabricate CMC composite parts. The fiber reinforcement may be densified using a liquid technique (impregnating with a resin that is a precursor for the ceramic matrix and transforming it into ceramic by cross-linking and pyrolysis, which process can be repeated), or by a gaseous technique (chemical vapor infiltration).

Furthermore, since the primary nozzle 120 in the exhaust system of the invention no longer supports the secondary nozzle, it does not have a structural function and can therefore serve as a liner performing no more than a channeling function for the hot inner stream. Consequently, the primary nozzle 120 can be made of a material that is lighter than a refractory metallic material of the Inconel® type as is commonly used. The primary nozzle 120 can advantageously be made of a CMC material as described above for the downstream secondary nozzle, the CMC material presenting good mechanical and chemical behavior in the face of high temperatures while also being lighter in weight than a metallic material.

When the upstream secondary nozzle is made of a metallic material and the downstream secondary nozzle is made of CMC material as described above, since CMC materials present a coefficient of expansion that is different from that of metallic materials, generally a coefficient that is significantly lower, it is necessary for the connection between these two portions to present the flexibility necessary for compensating the differences in dimensional variations of thermal origin between the interconnected parts without damaging the parts or the connection.

Figure 9:
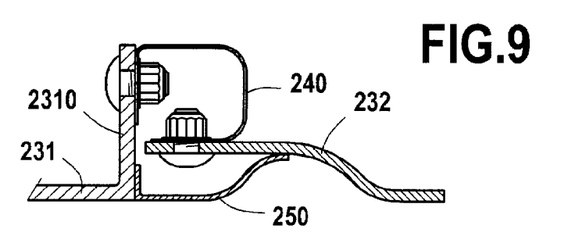
FIG. 9 is a fragmentary section view showing in highly diagrammatic manner one way of assembling secondary nozzles via flexible connections.

For this purpose, the upstream secondary nozzle and the downstream secondary nozzle can be assembled together via flexible connections that are suitable for compensating the differential expansion that occurs between the two secondary nozzles. As shown in FIG. 9, the flexible connections are embodied by metal connection tabs 240 that are curved so as to be elastically deformable. At one end, each connection tab 240 is fastened, e.g. by bolting, to a flange 2310 that is secured to the upstream secondary nozzle 231 in the vicinity of its downstream end edge. At its other end, each tab 240 is fastened, e.g. by bolting, to the wall of the downstream secondary nozzle 232 in the vicinity of its upstream end edge. Since clearance is present between the adjacent annular edge portions of the nozzles 231 and 232, sealing is provided by a sealing device 250 such as a split metal gasket having "petals" fastened to the downstream end of the nozzle 231.

Nevertheless, using such connection tabs implies a certain amount of manipulation and adjustment during assembly. Furthermore, the presence of connection tabs and a flange together with the need for a sealing device gives rise to an increase in weight and in production cost.

Figure 10:
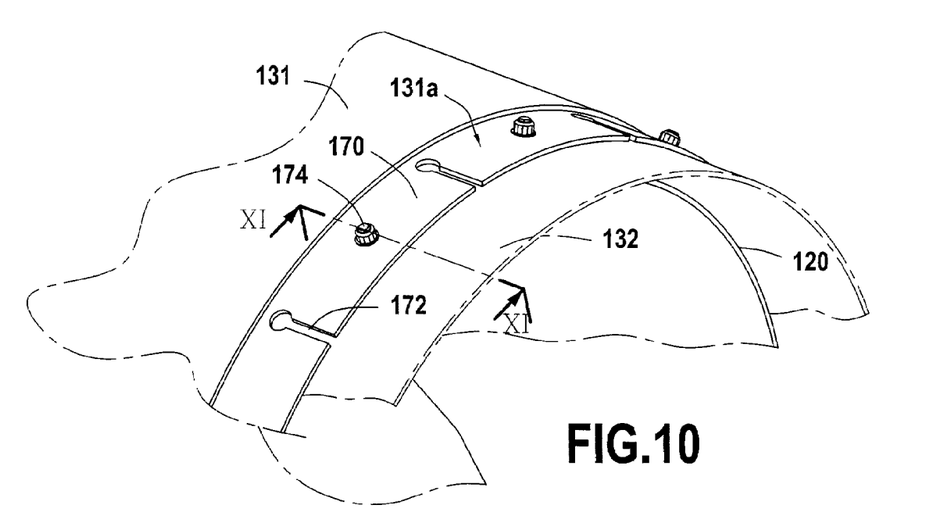
FIG. 10 is a view on a larger scale showing a detail of FIG. 2.
Figure 11:
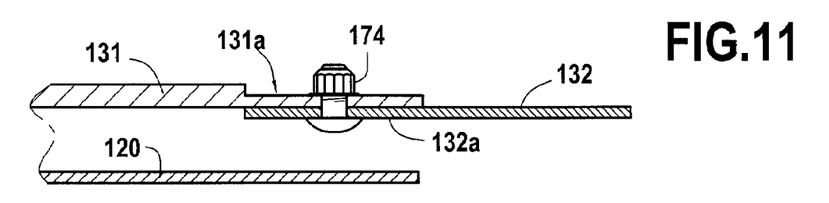
FIG. 11 is a section view on plane XI-XI of FIG. 10.

For this purpose, and as shown in FIGS. 2, 10, and 11, the flexible connection function can be incorporated directly in one of the two secondary nozzles so as to simplify assembly.

More precisely, the downstream annular edge portion 131a of the upstream secondary nozzle 131 and the upstream annular edge portion 132a of the downstream secondary nozzle 132 are engaged mutually with the edge portion 131a surrounding the edge portion 132a.

Tongues 170 are formed in the edge portion 131a, the tongues being separated by slots 172 that are obtained directly by being cut out or machined in the metallic material of the upstream secondary nozzle 131. The tongues 170 and slots 172 extend in a substantially axial direction from the downstream end of the edge portion 131a, with the slots terminating in rounded recesses so as to avoid stress concentrations at the ends of the slots.

The nozzles 131 and 132 are assembled together by bolting, with the heads of the bolts 174 bearing against the inside face of the downstream secondary nozzle 132. Fastening by bolting is performed via each tongue or at least via some of them. It is also possible to envisage fastening by riveting.

Preferably, the annular edge portions 132a, 131a are engaged in one another without clearance and with prestress when cold so that mutual contact is maintained at the high temperatures normally encountered in operation. By ensuring that the annular edge 132a is engaged in the annular edge portion 131a over a length that is not less than the length of the slots 172, sealing is then ensured at the connection between the upstream and downstream secondary nozzles.

By their capacity for elastic deformation, the tongues 170 enable differential expansion between the assembled-together parts to be compensated. The tongues 170 also serve to compensate for defects or irregularities of shape in the assembled-together edge portions. As shown, the edge portion 131a in which the tongues 170 are formed may be thinner than the remainder of the wall of the upstream secondary nozzle 131. Since the capacity for elastic deformation of metallic materials is generally greater than that of CMC materials, it is preferable to form the tongues in the part made of metallic material. Nevertheless, it is not impossible to make the tongues in the CMC material part.

The invention claimed is:

1. An exhaust system for channeling streams from a by-pass gas turbine, the system comprising:
    a stream-channeling nozzle;
    an exhaust casing for connecting the stream-channeling nozzle to the outlet of the gas turbine;
    said stream-channeling nozzle comprising a primary nozzle including an upstream end fastened to the exhaust casing and a secondary nozzle placed around the primary nozzle and including an upstream end fastened to the exhaust casing;
    means for fastening the secondary nozzle directly to the exhaust casing at the upstream end of the secondary nozzle, said secondary nozzle being supported by the exhaust casing independently of the primary nozzle, said means for fastening comprising a plurality of connection elements distributed around the upstream end of the secondary nozzle, said connection elements being fastened to the inner wall of the secondary nozzle and to a flange of the exhaust casing; and
    a plurality of flexible connection elements distributed around the upstream end of the primary nozzle, said flexible connection elements being fastened to the outer wall of the primary nozzle and to the flange of the exhaust casing.

2. An exhaust system according to claim 1, characterized in that the primary nozzle is made of a ceramic matrix composite material.

3. An exhaust system according to claim 1, characterized in that at least a portion of a flexible connection element of the primary nozzle is engaged with a connection element of the secondary nozzle in such a manner that orifices for fastening to the flange of the exhaust casing in said elements are aligned with one another.

4. An exhaust system according to claim 1, characterized in that the secondary nozzle is made up of an upstream secondary nozzle fastened at the upstream end to the exhaust casing, and a downstream secondary nozzle connected to a downstream end of the upstream secondary nozzle that is opposite from the upstream end fastened to the exhaust casing.

5. An exhaust system according to claim 4, characterized in that the upstream secondary nozzle is made of a metallic material and the downstream secondary nozzle is made of a ceramic matrix composite material.

6. An exhaust system according to claim 5, characterized in that the edge portion of the upstream secondary nozzle and the edge portion of the downstream secondary nozzle are engaged one in the other with little or no clearance, and in that one of the two secondary nozzles presents along an engagement edge a succession of tongues that are separated from one another by slots and that are formed integrally with said one of the secondary nozzles, said secondary nozzles being assembled together by being mutually fastened via at least some of the tongues.

7. An exhaust system according to claim 6, characterized in that the tongues are formed in the upstream secondary nozzle.

8. A by-pass gas turbine for an aeroengine, the gas turbine including an exhaust system according to claim 1.

9. An exhaust system according to claim 1, wherein:
    the primary nozzle is made of a ceramic matrix composite material;
    at least a portion of a flexible connection element of the primary nozzle is engaged with a connection element of the secondary nozzle in such a manner that orifices for fastening to the flange of the exhaust casing in said elements are aligned with one another;
    the secondary nozzle is made up of an upstream secondary nozzle fastened at the upstream end to the exhaust casing, and a downstream secondary nozzle connected to a downstream end of the upstream secondary nozzle that is opposite from the upstream end fastened to the exhaust casing;
    the upstream secondary nozzle is made of a metallic material and the downstream secondary nozzle is made of a ceramic matrix composite material;
    the edge portion of the upstream secondary nozzle and the edge portion of the downstream secondary nozzle are engaged one in the other with little or no clearance, and in that one of the two secondary nozzles presents along its engagement edge a succession of tongues that are separated from one another by slots and that are formed integrally with said one of the secondary nozzles, said secondary nozzles being assembled together by being mutually fastened via at least some of the tongues; and
    the tongues are formed in the upstream secondary nozzle.

10. A by-pass gas turbine for an aeroengine, the gas turbine including an exhaust system according to claim 9.

11. An assembly method for assembling an exhaust system for channeling the streams from a by-pass gas turbine, the system comprising a stream-channeling nozzle and an exhaust casing for connection to the channeling nozzle at the outlet from the gas turbine, said stream-channeling nozzle comprising a primary nozzle including an upstream end fastened to the exhaust casing and a secondary nozzle placed around the primary nozzle and including an upstream end fastened to the exhaust casing,
    the method being characterized in that the secondary nozzle is fastened directly to the exhaust casing at the upstream end of the secondary nozzle so as to support said secondary nozzle via the exhaust casing independently of the primary nozzle, wherein a plurality of connection elements are placed around the upstream end of the secondary nozzle, said connection elements being fastened to the inner wall of the secondary nozzle and to a flange of the exhaust casing; and
    a plurality of flexible connection elements are placed around the upstream end of the primary nozzle, said flexible connection elements being fastened to the outer wall of the primary nozzle and to the flange of the exhaust casing.

12. An assembly method according to claim 11, characterized in that the primary nozzle is made of a ceramic matrix composite material.

13. An assembly method according to claim 11, characterized in that at least a portion of a flexible connection element of the primary nozzle is engaged with a connection element of the secondary nozzle in such a manner that orifices for fastening to the flange of the exhaust casing in said elements are aligned with one another.

14. An assembly method according to claim 11, characterized in that the secondary nozzle is made up of an upstream secondary nozzle fastened at the upstream end to the exhaust casing, and a downstream secondary nozzle connected to a downstream end of the upstream secondary nozzle that is opposite from the upstream end fastened to the exhaust casing.

15. An assembly method according to claim 14, characterized in that the upstream secondary nozzle is made of a metallic material and the downstream secondary nozzle is made of a ceramic matrix composite material.

16. An assembly method according to claim 15, characterized in that the edge portion of the upstream secondary nozzle and the edge portion of the downstream secondary nozzle are engaged one in the other with little or no clearance, and in that a succession of tongues that are separated from one another by slots are formed along the engagement edge of one of the two secondary nozzles, the slots being obtained by cutting out or machining the material of said one of the secondary nozzles, and the secondary nozzles are assembled together by fastening at least some of the tongues to the edge portion of the other secondary nozzle.

17. An assembly method according to claim 16, characterized in that the tongues are formed in the edge portion of the upstream secondary nozzle.

18. An assembly method according to claim 11, characterized in that:
- the primary nozzle is made of a ceramic matrix composite material;
- at least a portion of a flexible connection element of the primary nozzle is engaged with a connection element of the secondary nozzle in such a manner that orifices for fastening to the flange of the exhaust casing in said elements are aligned with one another;
- the secondary nozzle is made up of an upstream secondary nozzle fastened at the upstream end to the exhaust casing, and a downstream secondary nozzle connected to a downstream end of the upstream secondary nozzle that is opposite from the upstream end fastened to the exhaust casing;
- the upstream secondary nozzle is made of a metallic material and the downstream secondary nozzle is made of a ceramic matrix composite material;
- the edge portion of the upstream secondary nozzle and the edge portion of the downstream secondary nozzle are engaged one in the other with little or no clearance, and in that a succession of tongues that are separated from one another by slots are formed along the engagement edge of one of the two secondary nozzles, the slots being obtained by cutting out or machining the material of said one of the secondary nozzles, and the secondary nozzles are assembled together by fastening at least some of the tongues to the edge portion of the other secondary nozzle; and
- the tongues are formed in the edge portion of the upstream secondary nozzle.

* * * * *